United States Patent [19]

Tsukamoto et al.

[11] Patent Number: 5,691,015
[45] Date of Patent: Nov. 25, 1997

[54] COMPOSITE FILM BAGS FOR PACKAGING

[75] Inventors: Yoshinori Tsukamoto; Michio Shimizu, both of Aichi, Japan

[73] Assignee: Aicello Chemical Co., Ltd., Toyohashi, Japan

[21] Appl. No.: 580,199

[22] Filed: Dec. 28, 1995

Related U.S. Application Data

[63] Continuation-in-part of Ser. No. 186,271, Jan. 25, 1994, abandoned.

[30] Foreign Application Priority Data

Jan. 25, 1993 [JP] Japan ................ 5-028548

[51] Int. Cl.$^6$ ................ B65D 65/40; B65D 30/02
[52] U.S. Cl. ................ 428/35.2; 428/35.4; 428/424.2; 428/502; 428/518; 383/1; 383/111; 383/211; 220/DIG. 30; 206/524.7
[58] Field of Search ................ 428/35.2, 35.4, 428/518, 36.6, 36.7, 423.1, 424.2, 502; 383/1, 111, 210, 211; 220/DIG. 30; 206/524.7; 4/451, 452, 144.2

[56] References Cited

U.S. PATENT DOCUMENTS

| | | | |
|---|---|---|---|
| 4,681,228 | 7/1987 | Kerry et al. | 206/484 |
| 4,844,828 | 7/1989 | Aoki | 510/296 |
| 5,015,513 | 5/1991 | Newbold et al. | 428/35.5 |
| 5,080,226 | 1/1992 | Hodakowski et al. | 206/205 |
| 5,230,944 | 7/1993 | Beer et al. | 428/195 |
| 5,279,421 | 1/1994 | Gouge et al. | 206/484 |
| 5,330,047 | 7/1994 | Gouge et al. | 206/205 |
| 5,429,874 | 7/1995 | Van Putte | 428/35.4 |
| 5,487,940 | 1/1996 | Bianchini et al. | 428/35.4 |
| 5,487,947 | 1/1996 | Kokashita et al. | 428/35.2 |

FOREIGN PATENT DOCUMENTS

| | | |
|---|---|---|
| 0011502 | 5/1980 | European Pat. Off. . |
| 0518689 | 12/1992 | European Pat. Off. . |
| 0520280 | 12/1992 | European Pat. Off. . |
| 2585248 | 1/1987 | France . |
| 97193 | 8/1979 | Japan . |
| 1054808 | 1/1967 | United Kingdom . |
| 2193925 | 2/1988 | United Kingdom . |
| 2244258 | 11/1991 | United Kingdom . |

*Primary Examiner*—Rena Dye
*Attorney, Agent, or Firm*—Sughrue, Mion, Zinn, Macpeak & Seas, PLLC

[57] ABSTRACT

A composite film bag 1 for packaging comprises a composite film of a water-insoluble film 2 and a water-soluble polyvinyl alcohol film 3 which are adhered to one another to such an extent that the former film 2 can easily be peeled off from the latter film 3 and which are formed into a bag so that the water-insoluble film 2 serves as an outer layer of the bag and the water-soluble polyvinyl alcohol film 3 serves as an internal layer thereof. A powdery or liquid agricultural chemical agent 6 is packed in the composite film bag 1 and the opening of the bag is sealed. Upon practical use, the outer water-insoluble film 2 is peeled off to expose the internal film 3 and the internal film 3 as such, while containing the agricultural chemical agent 6, is introduced into water. Thus, the internal film is dissolved in water and in turn the content 6 thereof is released and accordingly dissolved in water. The composite film bag 1 is not broken at all even when it is exposed to a low temperature condition.

5 Claims, 2 Drawing Sheets

COMPOSITE FILM BAGS FOR PACKAGING

This is a Continuation-in-Part of application Ser. No. 08/186,271 filed Jan. 25, 1994 which is now abandoned.

BACKGROUND OF THE INVENTION

The present invention relates to a bag made of a composite film for use in packaging, which does not cause any leakage of a packaged substance through pinholes formed on the wall of the bag (i.e., the content of the package), which in turn leads to contamination of the circumferential regions in the course of the distribution thereof and which ultimately permits the stable dissolution of the content thereof in water.

Agricultural chemicals are distributed in a variety of forms depending on the physical conditions thereof. Powdery agricultural chemicals are in general packed in a packaging material such as a laminate film comprising, for instance, an aluminum vapor-deposited polyester film and a polyethylene film, or paper, an aluminum foil and a polyethylene film, in order to prevent any quality deterioration through moisture uptake. In general, the agricultural chemicals withdrawn from their package are weighed, dissolved in water and sprayed on various fields. If operations for weighing the agricultural chemicals and for introducing it into a dissolution tank are performed in situ, the agricultural chemicals may be blown up by the wind, adhered to the circumference of the tank and the operator's body and/or the operator may inhale the powdery chemicals. Moreover, a packaging material contaminated with agricultural chemicals may become a cause of secondary environmental pollution and, therefore, should be disposed with the greatest circumspection.

To eliminate such inconvenience, a dose of powdery agricultural chemical agents is packed in a water soluble polyvinyl alcohol film and then the polyvinyl alcohol package is further wrapped up in a laminate film such as those listed above. Upon practical use of the packed agricultural chemical agents, the internal package of polyvinyl alcohol is withdrawn from the outermost wrapping and introduced into water contained in a tank without removing the polyvinyl alcohol film to thus dissolve the polyvinyl alcohol film and hence the content thereof (i.e., the agricultural chemical agents) in water. This allows the prevention of any contamination of the outer packaging material with powdery agricultural chemicals and any scattering of the powdery agricultural chemicals in the wind. Thus, agricultural chemicals can be handled with high safety and hygiene.

Most of agricultural chemicals are used during spring and summer seasons and correspondingly, the packaged agricultural chemicals are transported during winter season in the majority of cases. Polyvinyl alcohol films used as materials for packaging powdery agricultural chemicals have glass transition temperatures of approximately 0° C. and therefore, if they are exposed to a substantially low temperature during transportation by land or air in winter, pinholes and/or cracks are formed on the polyvinyl alcohol film serving as the packaging material due to vibration of trucks or air planes during transportation. This leads to leakage of the content of the film, i.e., the powdery agricultural chemicals, hence contamination of the interior of an outer wrapping film and, in some cases, discrepancy or reduction in the dosage of the agricultural chemicals packed in the polyvinyl alcohol film.

SUMMARY OF THE INVENTION

It is an object of the present invention to provide a bag of a composite film for packaging, which is suitably used for packaging powdery or liquid agricultural chemicals and which is never broken even during transportation at a low temperature. The composite film bag for packaging according to the present invention comprises an outer film and an internal polyvinyl alcohol film integrated together so that the outer film permits the prevention of any breakage of the internal polyvinyl alcohol film even during transportation at a temperature of not more than the brittle temperature (or the glass transition temperature) of the polyvinyl alcohol film, more specifically not more than 0° C. to −5° C. Moreover, upon practical use of the content of the package, the consumer can manually peel off the outer film to expose the internal polyvinyl alcohol film which is water-soluble. Accordingly, the polyvinyl alcohol film bag per se containing the powdery or liquid substances packed therein such as the agricultural chemicals can be introduced into water accommodated in a tank to dissolve or disperse the content therein.

The foregoing object of the present invention can effectively be accomplished by providing a bag of a composite film for packaging. The composite film bag of the present invention comprises a composite film of a water-insoluble film and a water-soluble polyvinyl alcohol film which are temporarily adhered to one another to such an extent that the water-insoluble film can easily be peeled off from the water-soluble film and which are formed into a bag so that the polyvinyl alcohol film serves as an internal layer of the bag and the water-insoluble film serves as an outer layer thereof.

DETAILED DESCRIPTION OF THE INVENTION

The composite film bag according to the present invention will hereunder be explained in more detail with reference to the accompanying drawings.

Figure 2:
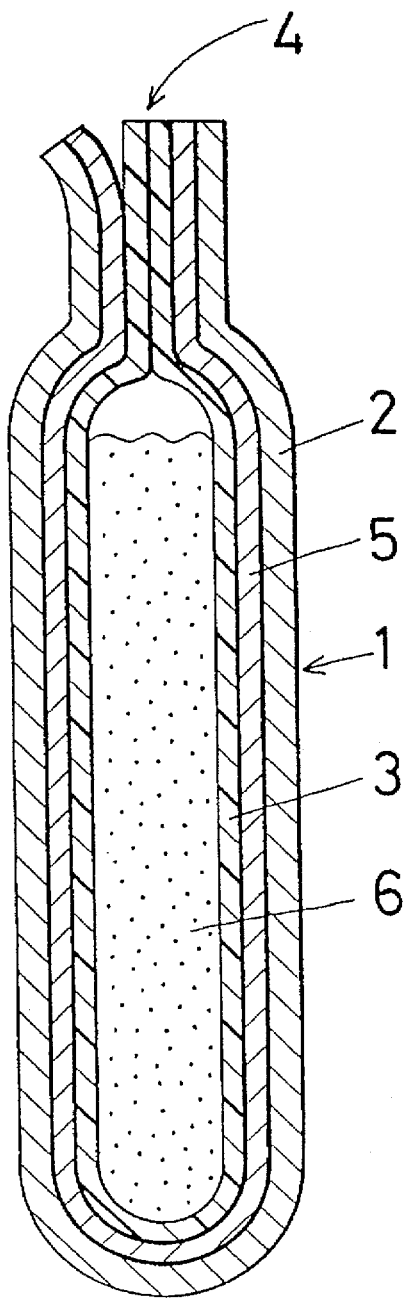
FIG. 2 is a cross sectional view showing an embodiment of the composite film bag for packaging according to the present invention.

As seen from the cross sectional view shown in FIG. 2, a composite film bag 1 for packaging comprises an outer film layer 2 and an internal film layer 3 which are temporarily adhered to one another through the use of an adhesive 5 to such an extent that the former film 2 can easily be peeled off from the latter film 3. A water-insoluble film is used as a material for the outer film layer 2. A water-soluble polyvinyl alcohol film is used as a material for the internal film layer 3.

The water-insoluble film used as the outer film layer 2 desirably has a glass transition temperature of not more than −5° C. or a tensile strength, as determined according to the test defined by JIS Z 1702, of not less than 3 kg/mm². Specific examples of such films are polyethylene, unoriented polypropylene, biaxially oriented polypropylene, biaxially oriented polyester, aliphatic polyester, polyvinyl chloride, unoriented nylon, biaxially oriented nylon, cellophane, chitosan and chitosan/cellulose films as well as these films on which an aluminum is vapor-deposited or an aluminum foil is laminated. The thickness of the outer film layer generally ranges from 5 to 500 μ and preferably 10 to 200 μ. This is because, if it is less than 5 μ, the outer film layer cannot easily be peeled off from the internal film layer and a part thereof may sometimes be broken during peeling off, while if it exceeds 500 μ, the film cannot easily be formed into a bag and thus the use thereof is unfavorable from the economical viewpoint.

The water-soluble polyvinyl alcohol film used in the composite film bag as the internal film layer 3 may be, for instance, partially saponified polyvinyl acetate films and polyvinyl alcohol films modified with, for instance, maleic acid or itaconic acid. The partially saponified polyvinyl acetate films preferably have a degree of saponification ranging from 70 to 98 mole % and the foregoing polymeric materials preferably have a degree of polymerization ranging from 500 to 3000. If the degree of saponification is less than 70 mole % or more than 98 mole %, the water-solubility thereof is impaired. On the other hand, if the degree of polymerizaion is less than 500, the film is insufficient in strength, while if it exceeds 3000, the dissolution thereof in water requires a long time. For this reason, the degree of saponification and polymerization should be limited to the range defined above. The thickness of the polyvinyl alcohol film ranges from 10 to 100 μ. This is because, if it is less than 10 μ, the resulting film never ensures proper strength, in particular, heat seal strength (resistance to heat-seal). On the other hand, if it exceeds 100 μ, a substantially long time period is required for complete dissolution thereof in water and thus the use thereof is unfavorable from the economical standpoint.

Examples of adhesive 5 for adhering the outer film 2 to the internal film 3 include solutions of adhesive resins such as polyurethanes, rubbers, amide resins, vinyl resins and acrylic resins in organic solvents or polyvinyl alcohol resins in water-containing organic solvents or an aqueous solvent. In the composite film obtained by adhering the outer film 2 to the internal film 3 through the adhesive 5, the film 3 is weakly adhered to the film 2 and can correspondingly be easily peeled off from the latter.

Preferable adhesive 5 is prepared from acrylic homopolymer or co-polymer resin polymerized with one or two more acrylic monomers, selected from methacrylate, acrylate, methyl methacrylate, methyl acrylate, ethyl methacrylate, ethyl acrylate, propyl methacrylate, propyl acrylate, butyl methacrylate, butyl acrylate, hydroxyethyl methacrylate, hydroxyethyl acrylate, hydroxypropyl methacrylate and hydroxypropyl acrylate, and crosslinked with a melamine prepolymer or a prepolymer having isocyanate group.

The composite film obtained by adhering the outer film 2 to the internal film 3 is in general folded so that the outside of the folded composite film is constituted by the outer film 2 and then the peripheral portions thereof are heat-sealed. Thus, the water-soluble polyvinyl alcohol film as the internal film 3 is welded together to give a composite film bag for packaging.

Figure 3:
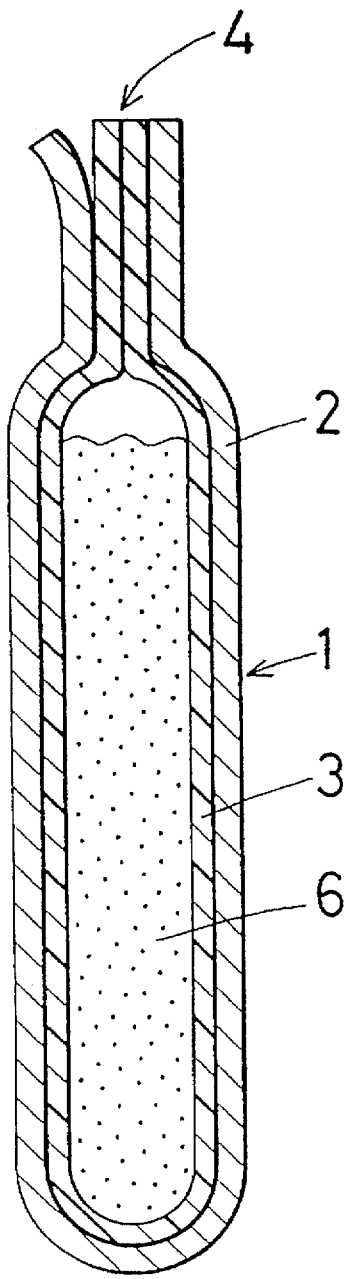
FIG. 3 is a cross sectional view showing another embodiment of the composite film bag for packaging according to the present invention.

The composite film bag 1 for packaging is in general used by introducing powdery or liquid substances (content 6) such as powdery agricultural chemicals, powdery medicines or powdery chemical agents into the bag 1 and then heat-sealing the opening to the bag 1. In FIGS. 2 and 3, the reference numeral 4 represents the line along which the composite film is heat-sealed.

Figure 1:
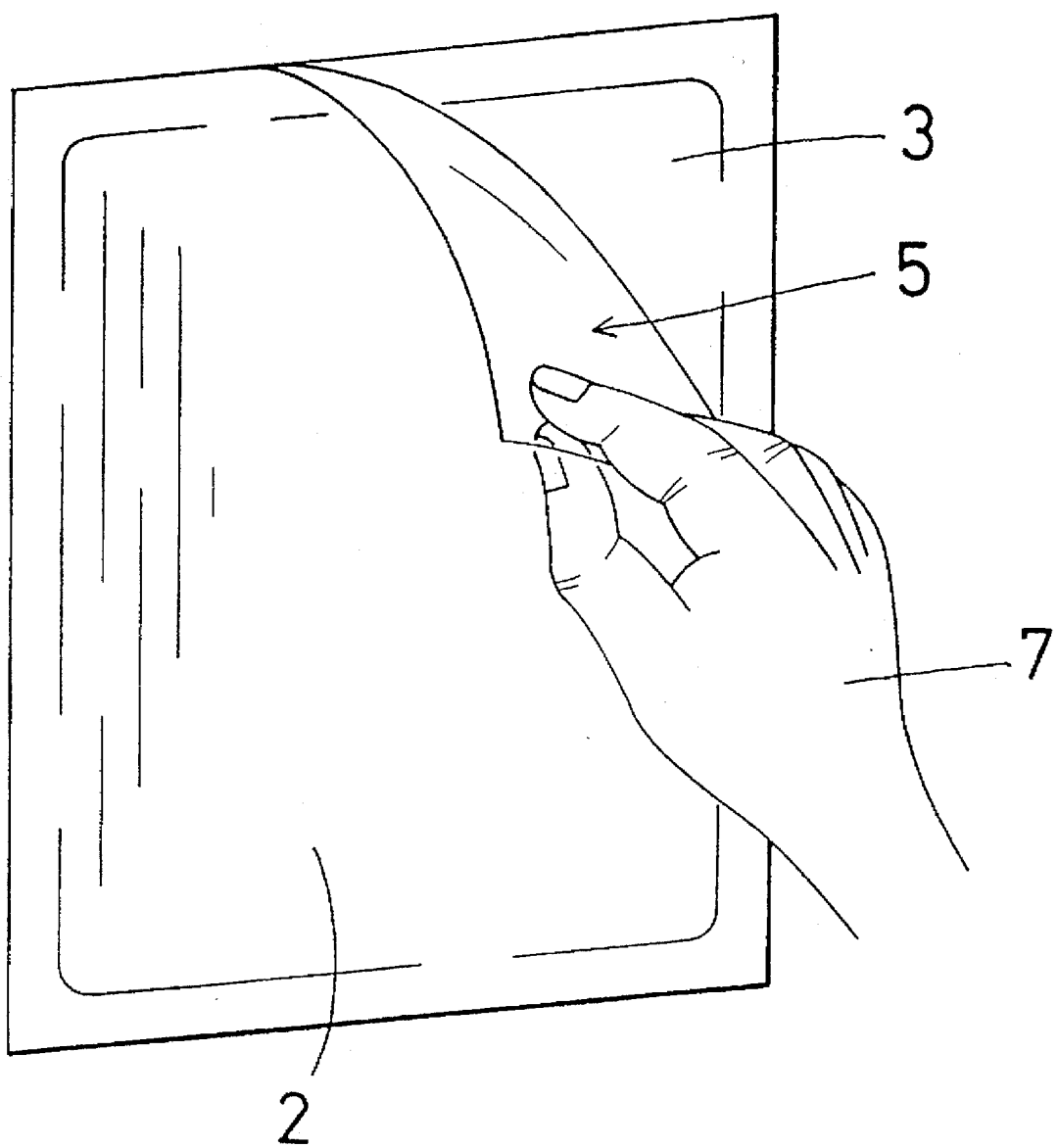
FIG. 1 is a perspective view for illustrating the composite film bag for packaging according to the present invention which is put in practical use.

As will be seen from FIG. 1, the outer film 2 can be peeled off, by hand 7, from the composite film bag 1 for packaging in which the content 6 is packaged to thus expose the outer surface of the internal film 3. When the internal film per se, which is still in the form of a bag and contains the content 6, is then introduced into water, the internal film is first dissolved therein and thus the content 6 is then released from the bag and dissolved in water. Moreover, if the content 6 comprises a powdery dye or a powdery compost, the internal film 3, which is still in the form of a bag and contains the content 6, is placed at a place where it is used and the content 6 can be released therefrom by dissolving the polyvinyl alcohol film 3 through spraying water on the bag or through the action of rainwater.

Alternatively, as seen from FIG. 3, the outer film 2 may directly be adhered to the internal film 3 without using any adhesive to give a bilayer film, i.e., a composite film bag 1 for packaging. The bilayer film of this type can be prepared by forming, in advance, one of the films required and then applying a solution of a polymer as a material for the other film onto the surface of the film previously formed.

In the composite film bag for packaging according to the present invention detailed above, the internal polyvinyl alcohol film is protected from any breakage due to the presence of the outer film having high resistance to low temperature conditions even if the bag (more specifically the internal film) is exposed to a temperature higher than the brittle point thereof in the course of the distribution thereof.

The present invention will hereunder be described in more detail with reference to the following working Examples, but the present invention is by no means limited to these specific Examples.

EXAMPLE 1

A biaxially oriented polyester film (available from Teijin Ltd.) having a thickness of 25 μ was subjected to a corona discharge treatment and the corona-discharged surface thereof was laminated with a polyvinyl alcohol film (available from Aicello Chemical Co., Ltd. under the trade name of Solublon KA-40) having a thickness of 40 μ through an adhesive layer of a polyvinyl methyl ether solution. This film was folded so that the outside of the folded composite film was constituted by the biaxially oriented polyester and the inside thereof was constituted by the polyvinyl alcohol layer, then the peripheral part thereof was heat-sealed to give a composite film bag for packaging having a longitudinal length of 15 cm and a width of 10 cm. These steps were repeated till 50 composite film bags were formed. An agricultural chemical agent (available from Nippon Ciba Geigy Co., Ltd. under the trade name of Ridomil) was introduced into these bags thus produced (100 g each) and the openings thereof were heat-sealed to give fifty sample bags packed with the agricultural chemical agent. They were put in a carton of corrugated board, then allowed to stand at −5° C. for one day, the sample bags while they were accommodated in the carton were dropped on a concrete ground from a level of 1 m high at room temperature and then each bag was inspected for the presence of pinholes. As a result, it was found that any pinhole was not formed on every bags. Then the biaxially oriented polyester film as the outer layer of the bag containing the agricultural chemical agent was manually peeled off to thus expose the polyvinyl alcohol film as the internal layer thereof and the bag was introduced into a tank containing 10 l of water to dissolve the polyvinyl alcohol layer and hence the content (agricultural chemical agent) of the bag. The bag was completely dissolved in water within one minute and the agricultural chemical agent contained therein was uniformly dispersed in water.

EXAMPLE 2

A 20% aqueous solution of a polyvinyl alcohol (PA-05 available from Shin-Etsu Chemical Co., Ltd.) to which 10 parts of glycerin had been added was applied, by a blade coater, onto the corona-discharged surface of a biaxially oriented polypropylene film (available from Tokyo Cellophane Co., Ltd.) which had a thickness of 25 μ and one side of which had been aluminum-deposited, so that the thickness of the coated layer of the solution was equal to 30 μ (weighed after drying). The resulting composite film was folded so that the outside of the folded composite film was constituted by the aluminum-deposited face of the polypropylene film and the inside thereof was constituted by the polyvinyl alcohol layer, then the same procedures used in Example 1 were repeated to give a composite film bag for packaging. Fifty sample bags were produced by repeating the same procedures used in Example 1. These bags were subjected to the dropping test which was carried out after allowing them to stand at −5° C. for one day and it was found that any pinhole was not formed on every sample bags at all. In water-dissolution test performed after peeling off the outer layer, it was found that the polyvinyl alcohol layer of each sample bag was dissolved in water within one minute and did not interfere with the dispersion of the agricultural chemical agent in water.

EXAMPLE 3

A chitosan/cellulose film having a thickness of 40 μ was laminated with a polyvinyl alcohol film having a thickness of 40 μ (available from Aicello Chemical Co., Ltd. under the trade name of Solublon PH-40) using an acrylic emulsion as an adhesive. The resulting composite film was processed by repeating the same procedures used in Example 1 to give a composite film bag for packaging. Fifty sample bags were produced by repeating the same procedures used in Example 1 and these bags were subjected to a dropping test which was carried out after allowing them to stand at −5° C. for one day. As a result, it was found that any pinhole was not formed on every sample bags at all. After peeling off the chitosan/cellulose film as the outer layer, each sample bag was introduced into water to inspect it for the dissolution in water and it was found that the polyvinyl alcohol layer of each sample bag was dissolved in water within one minute and that the agricultural chemical agent as the content thereof was uniformly dispersed in water.

EXAMPLE 4

A polyethylene film having a thickness of 80 μ one side of which had been processed for the improvement in the adhesion (Cold Seal available from Aicello Chemical Co., Ltd.) was laminated with a polyvinyl alcohol film (Solublon PH-50) having a thickness of 50 μ. The resulting laminate film was formed into a composite film bag for packaging by repeating the same procedures used in Example 1. The same procedures used in Example 1 were repeated till fifty sample bags were produced and the resulting bags were subjected to a dropping test which was carried out after allowing them to stand at −5° C. for one day. As a result, it was found that any pinhole was not formed on every sample bags at all. After peeling off the outer Cold Seal layer by hand, each sample bag was subjected to a dissolution test and the polyvinyl alcohol layer was found to be dissolved in water within one minute and the agricultural chemical agent as the content thereof was found to be easily and uniformly dispersed in water.

EXAMPLE 5

A polyethylene film having a thickness of 80 μ, one side of which had been processed for improvement in adhesion (Cold Seal MS, which is an acrylic co-polymer polymerized from a mixture of an ethyl acrylate and butyl acrylate and subsequently crosslinked by a prepolymer of melamine resin, available from Aicello Chemical Co., Ltd.) was laminated with a polyvinyl alcohol film (Solublon PH-50) having a thickness of 50 μ. The resulting laminate film was formed into a composite film bag for packaging by repeating the same procedure used in Example 1. The same procedures used in Example 1 were repeated until fifty sample bags had been subjected to a dropping test, which was carried out after allowing them to stand at −5° C. for one day. As a result, it was found that no pinholes were formed in any of the sample bags. After peeling off the outer Cold Seal MS layer by hand, each sample bag was subjected to a dissolution test and the polyvinyl alcohol layer was found to be dissolved in water within one minute, and the agricultural chemical agent content thereof was found to be easily and uniformly dispersed in water.

EXAMPLE 6

A polyethylene film having a thickness of 60 μ, one side of which had been processed for improvement in adhesion (Cold Seal PS, which is an acrylic co-polymer polymerized from a mixture of a methyl methacrylate and a butyl methacrylate and subsequently crosslinked by a prepolymer of melamine resin, available from Aicello Chemical Co., Ltd.) was laminated with a polyvinyl alcohol film (Solublon PT-40) having a thickness of 40 μ. The resulting laminate film was formed into a composite film bag for packaging by repeating the same procedure used in Example 1. The same procedures used in Example 1 were repeated until fifty sample bags had been subjected to a dropping test which was carried out after allowing them to stand at −5° C. for one day. As a result, it was found that no pinholes were formed in any of the sample bags. After peeling off the outer Cold Seal PS layer by hand, each sample bag was subjected to a dissolution test and the polyvinyl alcohol layer was found to be dissolved in water within one minute and the agricultural chemical agent content thereof was found to be easily and uniformly dispersed in water.

EXAMPLE 7

A polyethylene film having a thickness of 80 μ, one side of which had been processed for improvement in adhesion (Cold Seal TS, which is an acrylic co-polymer polymerized from a mixture of a hydroxypropyl acrylate and a hydroxyethyl acrylate and subsequently crosslinked by a prepolymer having isocyanate group, available from Aicello Chemical Co., Ltd.) was laminated with a polyvinyl alcohol film (Solublon KC-40) having a thickness of 40 μ. The resulting laminate film was formed into a composite film bag for packaging by repeating the same procedure used in Example 1. The same procedures used in Example 1 were repeated until fifty sample bags had been subjected to a dropping test which was carried out after allowing them to stand at −5° C. for one day. As a result, it was found that no pinholes were formed in any of the sample bags. After peeling off the outer Cold Seal TS layer by hand, each sample bag was subjected to a dissolution test and the polyvinyl alcohol layer was found to be dissolved in water within one minute, and the agricultural chemical agent content thereof was found to be easily and uniformly dispersed in water.

COMPARATIVE EXAMPLE 1

Separately, fifty internal packaging bags were prepared by heat-sealing a polyvinyl alcohol film (Solublon KA-40) and fifty outer packaging bags were prepared from a laminate film of an aluminum vapor-deposited polyester film with a polyethylene film through heat-sealings. An agricultural chemical agent (Ridomil; 100 g each) was packed in each internal packaging bag, the opening thereof was heat-sealed, further put in each outer packaging bag and the opening of the outer bag was again heat-sealed to give fifty comparative sample bags. These sample bags were put in a carton of corrugated board and subjected to a dropping test similar to that carried out in Example 1. Then the sample bags were withdrawn from the carton, the internal bags of polyvinyl alcohol were inspected for the presence of pinholes and 46 bags out of the 50 sample bags examined were found to have pinholes. Each internal packaging bag containing the agricultural chemical agent was removed from the corresponding outer packaging bag and introduced into water. As a result, it was found that the agricultural chemical agent was uniformly dispersed in water within one minute.

COMPARATIVE EXAMPLE 2

Fifty comparative sample bags each was prepared by putting an internal packaging bag containing an agricultural chemical agent identical to that used in Comparative Example 1 in an outer packaging bag prepared from a polypropylene film having a thickness of 60 μ and the resulting sample bags were subjected to a dropping test and a dissolution test. In the dropping test, 42 sample bags out of the 50 sample bags examined were found to have pinholes, while in the dissolution test, it was found that the agricultural chemical agent was uniformly dispersed in water within one minute.

What is claimed is:

1. A bag of a composite film for packaging comprising a composite film of a water-insoluble film and a water-soluble polyvinyl alcohol film which are adhered to one another with adhesive comprising acrylic polymer resin polymerized with monomers of at least one member selected from the group consisting of methacrylate, acrylate, methyl methacrylate, methyl acrylate, ethyl methacrylate, ethyl acrylate, propyl methacrylate, propyl acrylate, butyl methacrylate, butyl acrylate, hydroxyethyl methacrylate, hydroxyethyl acrylate, hydroxypropyl methacrylate and hydroxypropyl acrylate and followed by crosslinking with a melamine prepolymer or a prepolymer having an isocyanate group, so that the water-insoluble film is peelable from the polyvinyl alcohol film, and which are formed into a bag so that the polyvinyl alcohol film serves as an internal layer of the bag and the water-insoluble film serves as an outer layer of the bag.

2. The composite film bag of claim 1 wherein the water-soluble polyvinyl alcohol film is a polymer film selected from the group consisting of polyvinyl alcohol films modified with aleic acid, polyvinyl alcohol films modified with itaconic acid, and partially saponified polyvinyl acetate films having a degree of saponification ranging from 70 to 98 mole %.

3. The composite film bag of claim 1 wherein the adhesive is acrylic co-polymer polymerized from a mixture of ethyl acrylate and butyl acrylate and subsequently crosslinked by prepolymers of melamine resin.

4. The composite film bag of claim 1 wherein the adhesive is acrylic co-polymer polymerized from a mixture of methyl methacrylate and butyl methacrylate and subsequently crosslinked by prepolymers of melamine resin.

5. The composite film bag of claim 1 wherein the adhesive is acrylic co-polymer polymerized from a mixture of hydroxypropyl acrylate and hydroxyethyl acrylate and subsequently crosslinked by prepolymers having an isocyanate group.

* * * * *